US011130431B2

(12) United States Patent
Azimian et al.

(10) Patent No.: US 11,130,431 B2
(45) Date of Patent: Sep. 28, 2021

(54) BAND SUPPORTED HEADREST

(71) Applicant: Safran Seats USA LLC, Gainesville, TX (US)

(72) Inventors: Majid Azimian, Seattle, WA (US); Nguyen Foek Le, Arlington, TX (US); Daan Maria Lips, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 603 days.

(21) Appl. No.: 16/080,921

(22) PCT Filed: Jun. 20, 2016

(86) PCT No.: PCT/US2016/038309
§ 371 (c)(1),
(2) Date: Aug. 29, 2018

(87) PCT Pub. No.: WO2017/155561
PCT Pub. Date: Sep. 14, 2017

(65) Prior Publication Data
US 2021/0197700 A1    Jul. 1, 2021

Related U.S. Application Data

(60) Provisional application No. 62/306,315, filed on Mar. 10, 2016.

(51) Int. Cl.
*B60N 2/885* (2018.01)
*B64D 11/06* (2006.01)

(52) U.S. Cl.
CPC .......... *B60N 2/885* (2018.02); *B64D 11/0646* (2014.12)

(58) Field of Classification Search
CPC ..... B60N 2/885; B60N 2/888; B64D 11/0646
See application file for complete search history.

(56) References Cited

U.S. PATENT DOCUMENTS

| | | | |
|---|---|---|---|
| 7,744,158 B2* | 6/2010 | Schurg | B64D 11/0646 297/391 |
| 9,611,041 B2* | 4/2017 | Baker | B60N 2/885 |
| 10,118,512 B2* | 11/2018 | Dimovski | B60N 2/42 |
| 10,421,381 B2* | 9/2019 | Kuhne | B64D 11/0642 |
| 2003/0042783 A1 | 3/2003 | Potes et al. | |

(Continued)

FOREIGN PATENT DOCUMENTS

| EP | 1325837 | 7/2003 |
|---|---|---|
| WO | 2016/028677 | 2/2016 |

OTHER PUBLICATIONS

International Patent Application No. PCT/US2016/038309, International Preliminary Report on Patentability (Chapter I), dated Sep. 20, 2018.

(Continued)

*Primary Examiner* — Philip F Gabler
(74) *Attorney, Agent, or Firm* — Kilpatrick Townsend & Stockton LLP (57) ABSTRACT

A passenger seat headrest includes a frame and a support band. The frame includes a main portion, a first side wing connected to the main portion, and a second side wing connected to the main portion distal from the first side wing. The support band is connected to the frame and extends from the first side wing to the second side wing.

19 Claims, 8 Drawing Sheets

(56) References Cited

U.S. PATENT DOCUMENTS

2003/0085607 A1\* 5/2003 Jones ..................... A47C 5/06
297/452.56
2005/0127735 A1 6/2005 Munsch

OTHER PUBLICATIONS

Europe Patent Application No. 16733828.4, Communication pursuant to Rules 161(1) and 162 EPC, dated Oct. 17, 2018.
Europe Patent Application No. 16733828.4, Communication pursuant to Article 94(3) EPC, dated Dec. 17, 2019.
Europe Patent Application No. 16733828.4, Decision to grant a European patent pursuant to Article 97(1) EPC, dated Dec. 10, 2020.
International Patent Application No. PCT/US2016/038309, International Search Report and Written Opinion, dated Dec. 23, 2016.

\* cited by examiner

BAND SUPPORTED HEADREST

REFERENCE TO RELATED APPLICATION

This application claims the benefit of U.S. Provisional Application No. 62/306,315, filed Mar. 10, 2016 and entitled HAMMOCK SUPPORTED HEADREST, which is incorporated in its entirety by this reference.

BACKGROUND

Field

This application relates to passenger seats, and more particularly to headrests of an improved type.

Background Technology

Passenger vehicles, such as aircraft, buses, trains, ships, and automobiles, include passenger seats for passengers to sit in and utilize during travel. Passenger seats, such as passenger aircraft seats, are typically provided with a padded or foam-filled headrest that provides a passenger with protection by limiting rearward movement of the passenger's head and a place for the passenger to rest his or her head. However, common headrests insufficiently support the passenger's head, are not comfortable, are not controllable by the passenger. Moreover, common headrests add weight to the passenger vehicle, which may take away from other features, components, passengers, or payload on vehicles that commonly have weight restrictions. As a result, there is still a need for a headrest that caters to the support, comfort, weight, and control aspects of passenger seats all at once.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat headrest includes a frame comprising a main portion, a first side wing connected to the main portion, and a second side wing connected to the main portion distal from the first side wing. The passenger seat headrest also includes a support band connected to the frame and extending from the first side wing to the second side wing.

In some cases, the support band is a first support band, and the passenger seat headrest further comprises a second support band connected to the frame and extending from the first side wing to the second side wing. In various aspects, the first support band and the second support band are elastic support bands. The main portion of the frame comprises a forward surface and an aft surface. In some aspects, the first support band is positioned proximate to the forward surface of the main portion of the frame relative to the second support band, and the first support band is positioned proximate to a top edge of the first side wing and a top edge of the second side wing relative to the second support band.

In various examples, the frame includes: a top edge; a bottom edge distal from the top edge; a first side edge extending from the top edge to the bottom edge; a second side edge extending from the top edge to the bottom edge distal from the first side edge; a forward surface; and an aft surface. In certain examples, the first side edge and the second side edge extend in a forward direction relative to the forward surface of the main portion of the frame.

In further examples, the passenger seat headrest includes a support connected to the frame. The support includes a main portion, a first side wing connected to the main portion through a first transition portion, and a second side wing connected to the main portion distal from the first side wing through a second transition portion. In various cases, the main portion of the support is positioned adjacent to the main portion of the frame, the first side wing of the support is positioned adjacent to the first side wing of the frame, and the second side wing of the support is positioned adjacent to the second side wing of the frame. In some examples, the passenger seat headrest further includes: a first insert positioned between the first side wing of the frame, the main portion of the frame, and the first transition portion of the support; and a second insert positioned between the second side wing of the frame, the main portion of the frame, and the second transition portion of the support.

In some aspects, the first side wing and the second side wing of the support each define a securing slot dimensioned to receive at least a portion of the support band. In various examples, the first side wing and the second side wing each define a securing slot, and wherein the elastic strip is secured in the securing slot of the first side wing and the securing slot of the second side wing. In some cases, the securing slots are substantially parallel.

In other aspects, a passenger seat includes: a passenger seat body; and a passenger seat headrest connected to the passenger seat body. The passenger seat headrest includes: a frame having side wings and defining a head-receiving area; and an elastic support band connected to the frame and spanning across the head-receiving area.

In some examples, the passenger seat headrest further comprises: cushioning covering at least a portion of the frame; and a dress cover covering the frame, the elastic support band, and the cushioning. In various cases, the frame is constructed from a composite material. In various examples, the elastic support band is a first elastic support band, and the passenger seat headrest further comprises a second elastic support band connected to the frame and spanning across the head-receiving area. In certain examples, the side wings of the frame define a first set of securing slots and a second set of securing slots, wherein the first elastic support band is connected to the frame through the first set of securing slots, and wherein the second elastic band is connected to the frame through the second set of securing slots.

In some aspects, a passenger seat headrest includes a frame. The passenger seat headrest also includes a support connected to the frame. The support includes a main portion, a first side wing connected to the main portion and defining a securing slot, and a second side wing connected to the main portion distal from the first side wing and defining a securing slot. The passenger seat headrest also includes an elastic support band connected to the frame and extending through the securing slot of the first side wing and the securing slot of the second side wing.

The frame includes: a main portion; a first side wing connected to the main portion; and a second side wing connected to the main portion distal from the first side wing. In various examples, the main portion of the frame is adjacent to the main portion of the support, the first side wing of the frame is adjacent to the first side wing of the support, and the second side wing of the frame is adjacent to the second side wing of the support. In some examples, the elastic support band is a first elastic support band, and the passenger seat headrest further includes a second elastic support band connected to the frame and extending through the first side wing and the second side wing of the support.

In various cases, the first side wing of the frame defines a securing slot and the second side wing of the frame defines a securing slot. In these cases, the securing slot of the first side wing of the frame is aligned with the securing slot of the first side wing of the support, and the securing slot of the second side wing of the frame is aligned with the securing slot of the second side wing of the support. In various aspects, the passenger seat headrest further includes structural foam connected to a forward surface of the support.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat assemblies tray table assemblies for use with passenger seats. While the adjustable support assemblies are discussed for use with aircraft seats, they are by no means so limited. Rather, embodiments of the adjustable support assemblies may be used in passenger seats or other seats of any type or otherwise as desired. Directional references such as "forward," "aft," "up," "down," "top," "left," "right," "front," "back," and "corners," among others are intended to refer to the orientation as illustrated and described in the figure (or figures) to which the components and directions are referencing.

In one aspect, disclosed is a passenger seat headrest and associated methods, systems, devices, and various apparatus. The passenger seat headrest can comprise a frame and a support band. It would be understood by one of skill in the art that the disclosed passenger seat headrest is described in but a few exemplary aspects among many.

Referring to FIGS. 1-7, a passenger seat 10 having a passenger seat body 12 and a passenger seat headrest 14 is illustrated with all cushioning and dress cover removed from the passenger seat body 12 and the passenger seat headrest 14. Typically, the passenger seat body 12 includes a base (not shown) and a backrest 16. In some aspects, the backrest 16 is pivotable relative to the base such that a passenger can recline or otherwise move the backrest 16 to various positions relative to the base. Optionally, the passenger seat body 12 can include armrests (not shown).

The passenger seat headrest 14 is connected to the backrest 16. In some aspects, the passenger seat headrest 14 is connected to a forward-facing side 18 of the backrest 16. However, the location at which the passenger seat headrest 14 connects to the backrest 16 should not be considered limiting on the current disclosure. For example, in other aspects, the passenger seat headrest 14 is connected to a top edge 20 of the backrest 16. In some examples, the passenger seat headrest 14 is fixed relative to the backrest 16. However, in other examples, the passenger seat headrest 14 is movable relative to the backrest 16 such that a position of the passenger seat headrest 14 relative to the backrest 16 can be adjusted for a passenger. As one non-limiting example, the passenger seat headrest 14 is movable through a slide assembly 22, although in various other examples, other suitable movement mechanisms can be utilized.

As illustrated in FIGS. 1-7, the passenger seat headrest 14 includes a frame 24. The frame 24 includes a main portion 26, a first side wing 28 connected to the main portion 26, and a second side wing 30 connected to the main portion 26 distal from the first side wing 28. The frame 24 also includes a top edge 32, a bottom edge 34 distal from the top edge 32, a first side edge 36 extending from the top edge 32 to the bottom edge 34, a second side edge 38 extending from the top edge 32 to the bottom edge 34 distal from the first side edge 36, a forward surface 40, and an aft surface 42. As illustrated in FIGS. 1-7, the first side edge 36 and the second side edge 38 extend in a forward direction relative to the forward surface 40 of the main portion 26 of the frame 24. In this aspect, the first side wing 28 and the second side wing 30 extend in the forward direction relative to the forward surface 40 of the main portion 26. The angles at which the first side wing 28 and the second side wing 30 extend in the forward direction relative to the main portion 26 should not be considered limiting on the current disclosure. As one non-limiting example, each of the first side wing 28 and the second side wing 30 may be at an angle from about 0° to about 180° relative to the main portion 26, such as 60°, 75°, 80°, 90°, 115°, 120°, 135°, 140°, or various other angles relative to the main portion 26. As illustrated in FIGS. 1-7, the main portion 26, the first side wing 28, and the second side wing 30 define a head-receiving area 56 into which the passenger can position his or her head.

Figure 1:
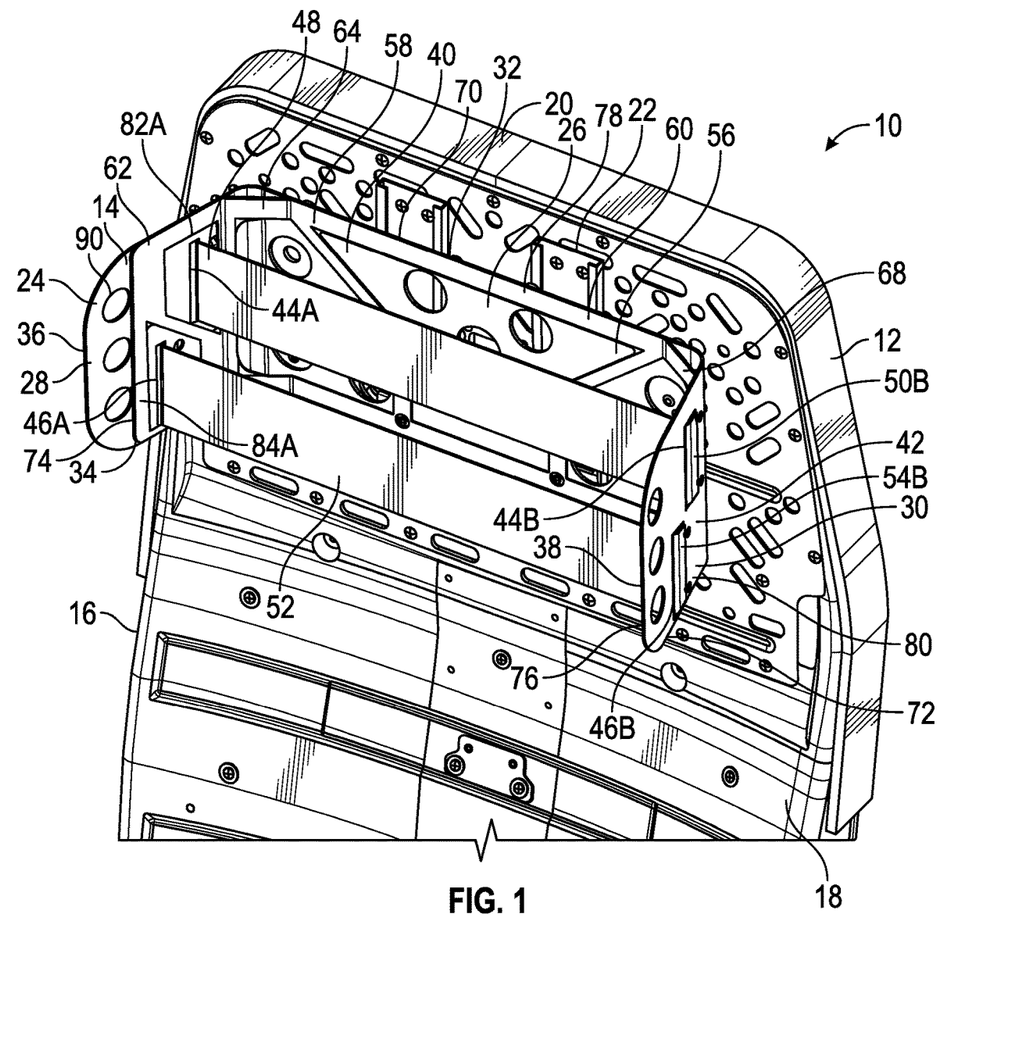
FIG. 1 is a perspective view of a passenger seat and a passenger seat headrest in accordance with an aspect of the current disclosure.

In various examples, the side wings 28 and 30 define head securing slots 44A and 44B, respectively. As described in greater detail below, the head securing slots 44A,B are dimensioned to receive a head support band 48 such that the head support band 48 is connected to the frame 24. In further examples, the side wings 28 and 30 define neck securing slots 46A and 46B, respectively. As described in greater detail below, the neck securing slots 46A,B are dimensioned to receive a neck support band 52 such that the neck support band 52 is connected to the frame 24. As illustrated in FIG. 1, the head securing slots 44A,B are aligned and the neck securing slots 46A,B are aligned. In some examples, the head securing slots 44A,B and/or the neck securing slots 46A,B extend substantially perpendicular to the top edge 32. However, in various other examples, the head securing slots 44A,B and/or the neck securing slots 46A,B extend at various other angles relative to the top edge 32. In various examples, the head securing slots 44A,B may be substantially parallel to the neck securing slots 46A,B, although they need not be.

As illustrated in FIGS. 1-7, in some aspects, the head securing slots 44A,B are defined in the first side wing 28 and the second side wing 30, respectively, at locations proximate to the main portion 26 relative to the neck securing slots 46A,B. In this aspect, the neck securing slots 46A,B are positioned proximate the first side edge 36 and the second side edge 38, respectively, relative to the head securing slots 44A,B.

In further aspects, the head securing slots 44A,B are defined in the first side wing 28 and the second side wing 30, respectively, at locations proximate to the top edge 32 relative to the neck securing slots 46A,B. In this aspect, the neck securing slots 46A,B are positioned proximate the bottom edge 34 relative to the head securing slots 44A,B.

Referring to FIGS. 1-7, in various examples, the passenger seat headrest 14 also includes the head support band 48. The head support band 48 is constructed from an elastomer or other suitable elastic materials. The head support band 48 includes connectors 50A,B (connector 50A illustrated in FIG. 2) at opposing ends of the head support band 48. The connectors 50A,B are utilized to connect the head support band 48 to the frame 24 by engaging the head securing slots 44A and 44B of the first side wing 28 and the second side wing 30, respectively. In various aspects, the head support band 48 is removably connected to the frame 24 via the connectors 50A,B such that the head support band 48 can be replaced as needed. In the present example, hooks are used as the connectors 50A,B, although in various other examples, various other types of connectors can be utilized. As illustrated in FIGS. 1-7, when the head support band 48 is connected to the frame 24, the head support band 48 extends from the first side wing 28 of the frame 24 to the second side wing 30 of the frame 24. In this aspect, the head support band 48 spans across the head-receiving area 56.

In some examples, the passenger seat headrest 14 also includes the neck support band 52. Similar to the head support band 48, the neck support band 52 is constructed from an elastomer or other suitable elastic materials. The neck support band 52 includes connectors 54A,B (connector 54A illustrated in FIG. 2) at opposing ends of the neck support band 52. The connectors 54A,B are utilized to connect the neck support band 52 to the frame 24 by engaging the neck securing slots 46A and 46B of the first side wing 28 and the second side wing 30, respectively. In various aspects, the neck support band 52 is removably connected to the frame 24 via the connectors 54A,B such that the neck support band 52 can be replaced as needed. In the present example, hooks are used as the connectors 54A,B, although in various other examples, various other types of connectors can be utilized. As illustrated in FIGS. 1-7, when the neck support band 52 is connected to the frame 24, the neck support band 52 extends from the first side wing 28 of the frame 24 to the second side wing 30 of the frame 24. In this aspect, the neck support band 52 spans across the head-receiving area 56.

In some examples, because of the positioning of the head securing slots 44A,B and the neck securing slots 46A,B, the head support band 48 is positioned at a location proximate to the main portion 26 of the frame 24 relative to the neck support band 52. In this aspect, the neck support band 52 is positioned proximate the first side edge 36 and the second side edge 38, respectively, of the frame 24 relative to the head support band 48. In further aspects, the head support band 48 is positioned at a location proximate to the top edge 32 relative to the neck support band 52. In this aspect, the neck support band 52 is positioned proximate the bottom edge 34 relative to the head support band 48. As described below with reference to FIG. 9, the head support band 48 and the neck support band 52 are positioned such that a neck and a head of a passenger can be positioned against the respective support bands.

In various examples, the passenger seat headrest 14 includes a support 58 connected to the frame 24. In various examples, the support 58 provides stiffness to position the side wings 28 and 30 relative to the main portion 26 of the frame 24. The support 58 includes a main portion 60, a first side wing 62 connected to the main portion 60 through a first transition portion 64, and a second side wing 66 (illustrated in FIG. 2) connected to the main portion 60 through a second transition portion 68 distal from the first side wing 62. The support 58 also includes a top edge 70, a bottom edge 72 distal from the top edge 70, a first side edge 74 extending from the top edge 70 to the bottom edge 72, a second side edge 76 extending from the top edge 70 to the bottom edge 72 distal from the first side edge 74, a forward surface 78, and an aft surface 80. As illustrated in FIGS. 1-7, the first side edge 74 and the second side edge 76 extend in a forward direction relative to the forward surface 78 of the main portion 60 of the support 58. In this aspect, the first side wing 62 and the second side wing 66 extend in the forward direction relative to the forward surface 78 of the main portion 60. The angles at which the first side wing 62 and the second side wing 66 extend in the forward direction relative to the main portion 60 should not be considered limiting on the current disclosure.

In various examples, the side wings 62 and 66 define head securing slots 82A and 82B (head securing slot 82B illustrated in FIG. 2), respectively. As described in greater detail below, the head securing slots 82A,B are dimensioned to receive the head support band 48 through the slots 82A,B, such that the head support band 48 connects to the frame 24.

In further examples, the side wings 62 and 66 define neck securing slots 84A and 84B (neck securing slot 84B illustrated in FIG. 2), respectively. As described in greater detail below, the neck securing slots 84A,B are dimensioned to receive the neck support band 52 through the slots 84A,B, such that the neck support band 52 connects to the frame 24. In some aspects, the head securing slots 82A,B of the support 58 are aligned with the head securing slots 44A,B of the frame 24 and the neck securing slots 84A,B of the support 58 are aligned with the neck securing slots 46A,B of the frame 24. In some examples, the head securing slots 82A,B of the support 58 can have a shape similar to or dissimilar to a shape of the head securing slots 44A,B of the frame 24. In a similar manner, the neck securing slots 84A,B of the support 58 can have a shape similar to or dissimilar to a shape of the neck securing slots 46A,B of the frame 24.

Figure 2:
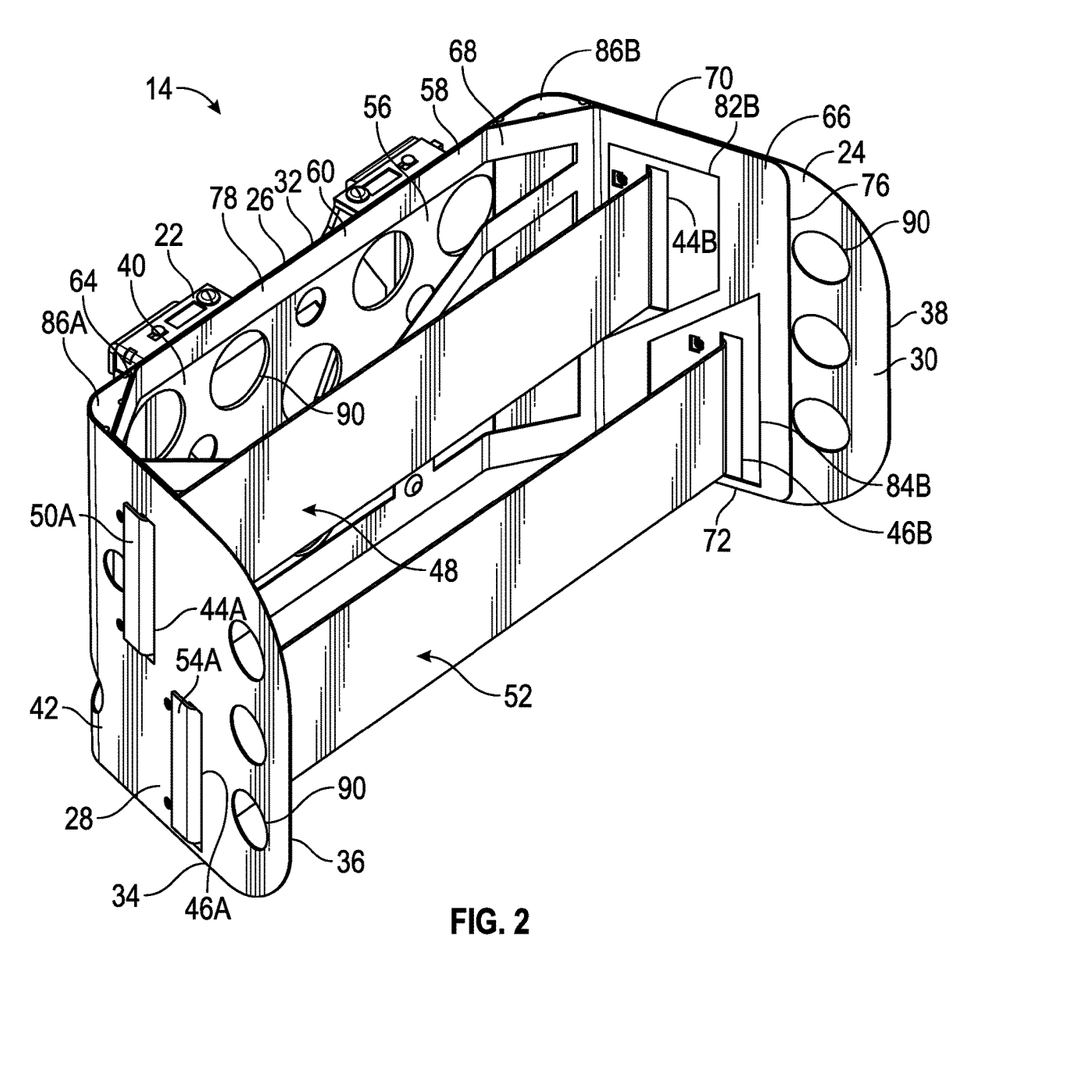
FIG. 2 is a perspective view of the passenger seat headrest of FIG. 1.
Figure 3:
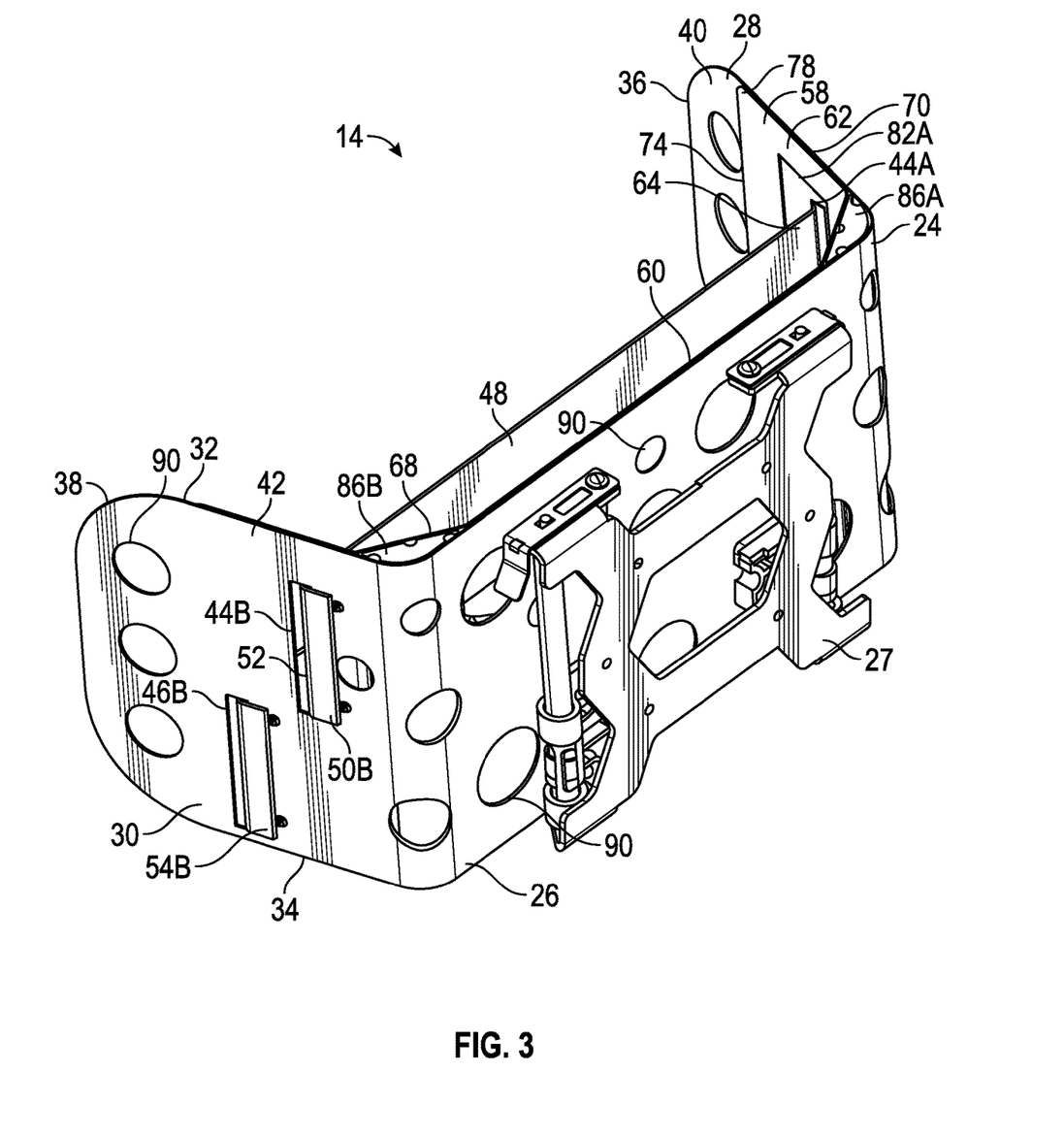
FIG. 3 is another perspective view of the passenger seat headrest of FIG.
Figure 4:
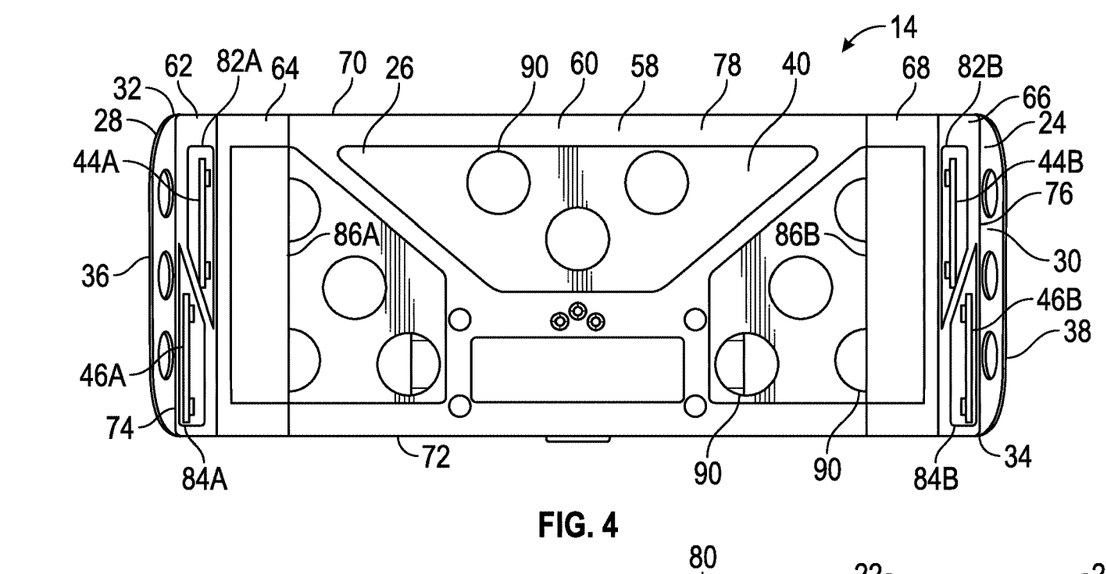
FIG. 4 is a front view of the passenger seat headrest of FIG. 1.
Figure 5:
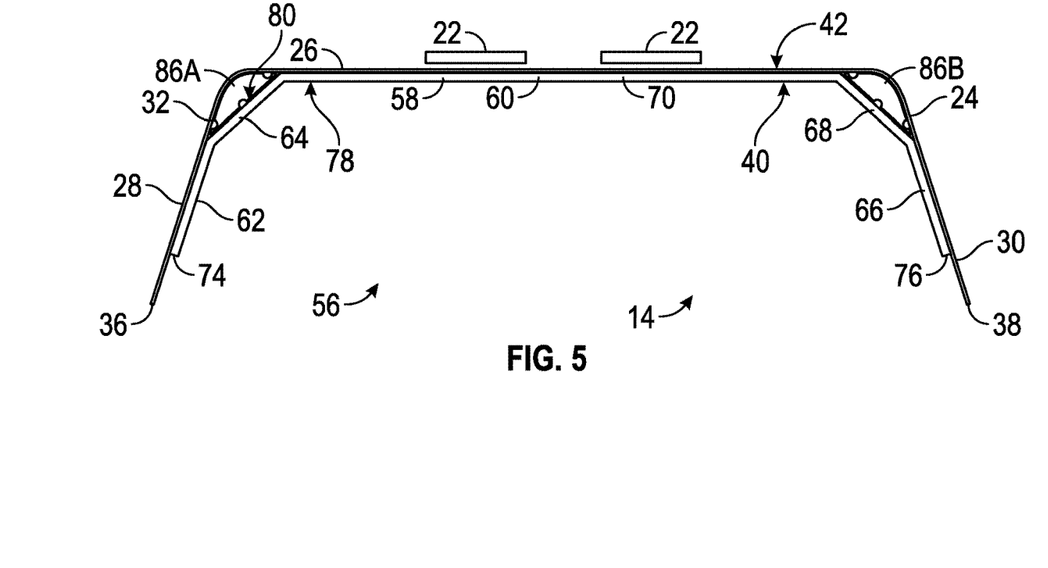
FIG. 5 is a top view of the passenger seat headrest of FIG. 1.
Figure 6:
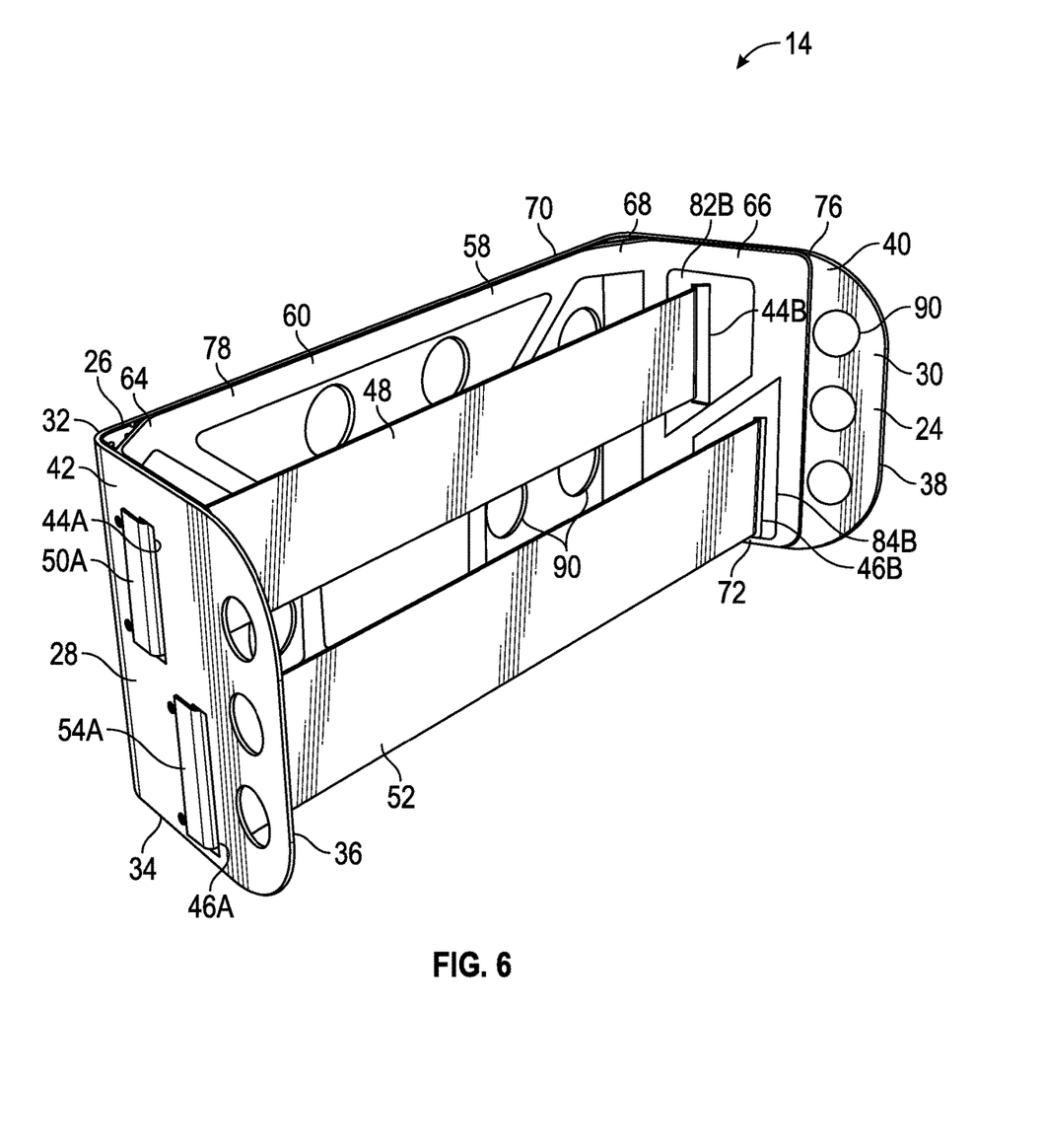
FIG. 6 is another perspective view of the passenger seat headrest of FIG.

As illustrated in FIGS. 1-7, when the support 58 is connected to the frame 24, the main portion 60 of the support 58 is positioned adjacent to the main portion 26 of the frame 24, the first side wing 62 of the support 58 is positioned adjacent to the first side wing 28 of the frame 24, and the second side wing 66 of the support 58 is positioned adjacent to the second side wing 30 of the frame 24. In some examples, as illustrated in FIG. 2, the passenger seat headrest 14 includes a first insert 86A positioned between the first side wing 28 of the frame 24, the main portion 26 of the frame 24, and the first transition portion 64 of the support 58. In a similar manner, the passenger seat headrest 14 includes a second insert 86B positioned between the second side wing 30 of the frame 24, the main portion 26 of the frame 24, and the second transition portion 68 of the support 58. In various examples, the inserts 86A,B are utilized to help increase the strength of the frame 24.

In various aspects, the frame 24 and support 58 are constructed from a composite material. As one non-limiting example, the frame 24 and support 58 are constructed from a carbon-fiber reinforced composite. However, the materials used to construct the frame 24 and support 58 should not be considered limiting on the current disclosure as it is contemplated that various other materials including, but not limited to various composites, metals, woods, plastics, or various other materials can be utilized. It will also be appreciated that the shape of the frame 24 and support 58 are should not be considered limiting on the current disclosure as it is contemplated that the frame 24 and support 58 are can have any desired shape. In some embodiments, as illustrated in FIGS. 1-7, the frame 24 and support 58 define a plurality of attachment holes, which can be utilized to attach a height attachment mechanism, such as the slide assembly 22, or directly to the passenger seat 10.

In further examples, depending on the material used to construct the frame 24, the support 58 may be omitted from the passenger seat headrest 14. As one non-limiting example, in various embodiments where the frame 24 is constructed from a composite material, the composite material may be sufficiently stiff or rigid such that the support 58 is not needed to help position the side wings 28 and 30 relative to the main portion 26 of the frame 24.

In further examples, to reduce the weight of the passenger seat headrest 14, the frame 24 and support 58 may define weight-reduction holes 90. As one non-limiting example, the passenger seat headrest 14 is designed to weigh less than 287 grams. In these examples, the weight-reduction holes 90 may be utilized to reduce the weight of the passenger seat headrest 14.

Figure 7:
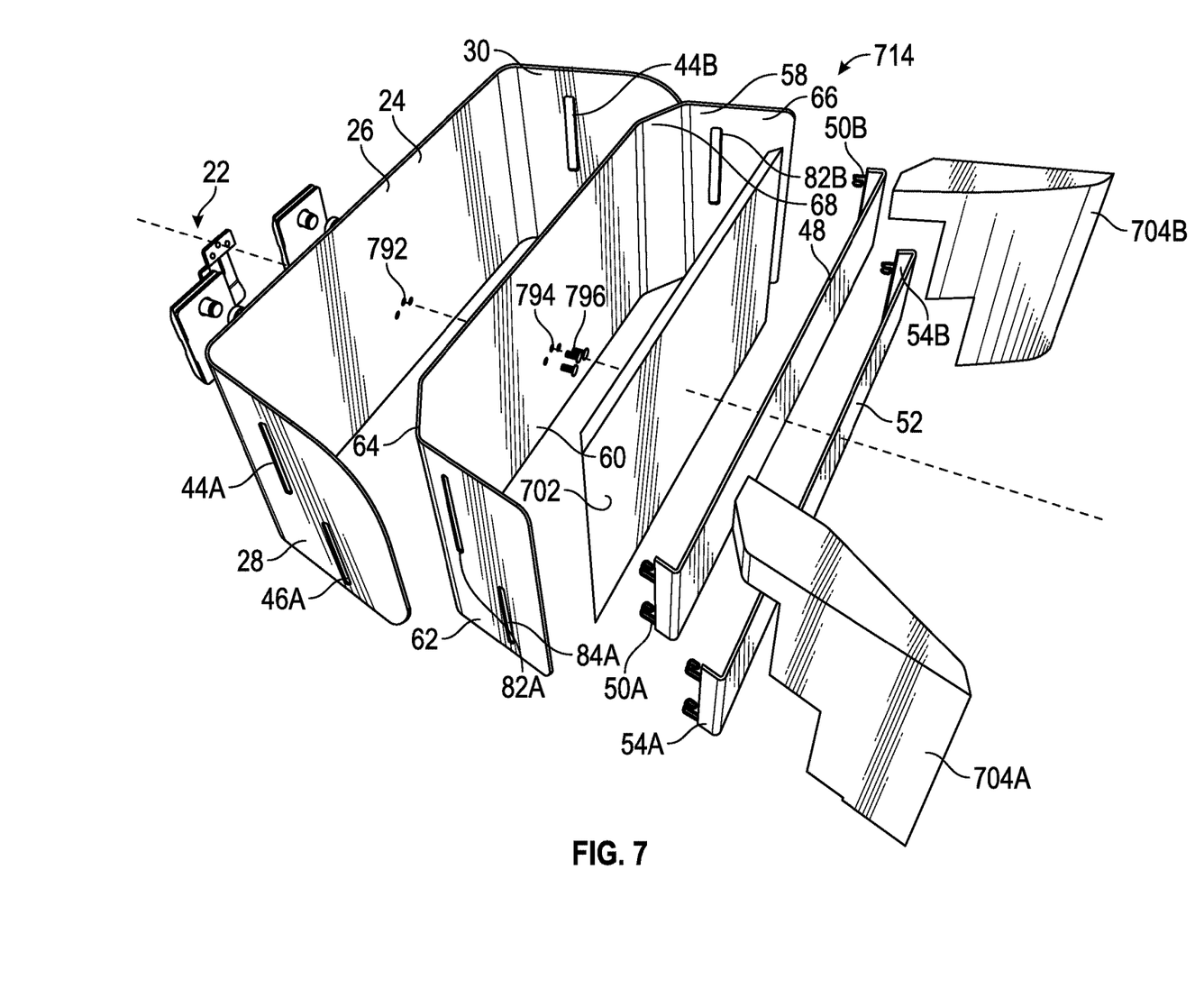
FIG. 7 is an exploded assembly view of a passenger seat headrest according to an aspect of the current disclosure.
Figure 8:
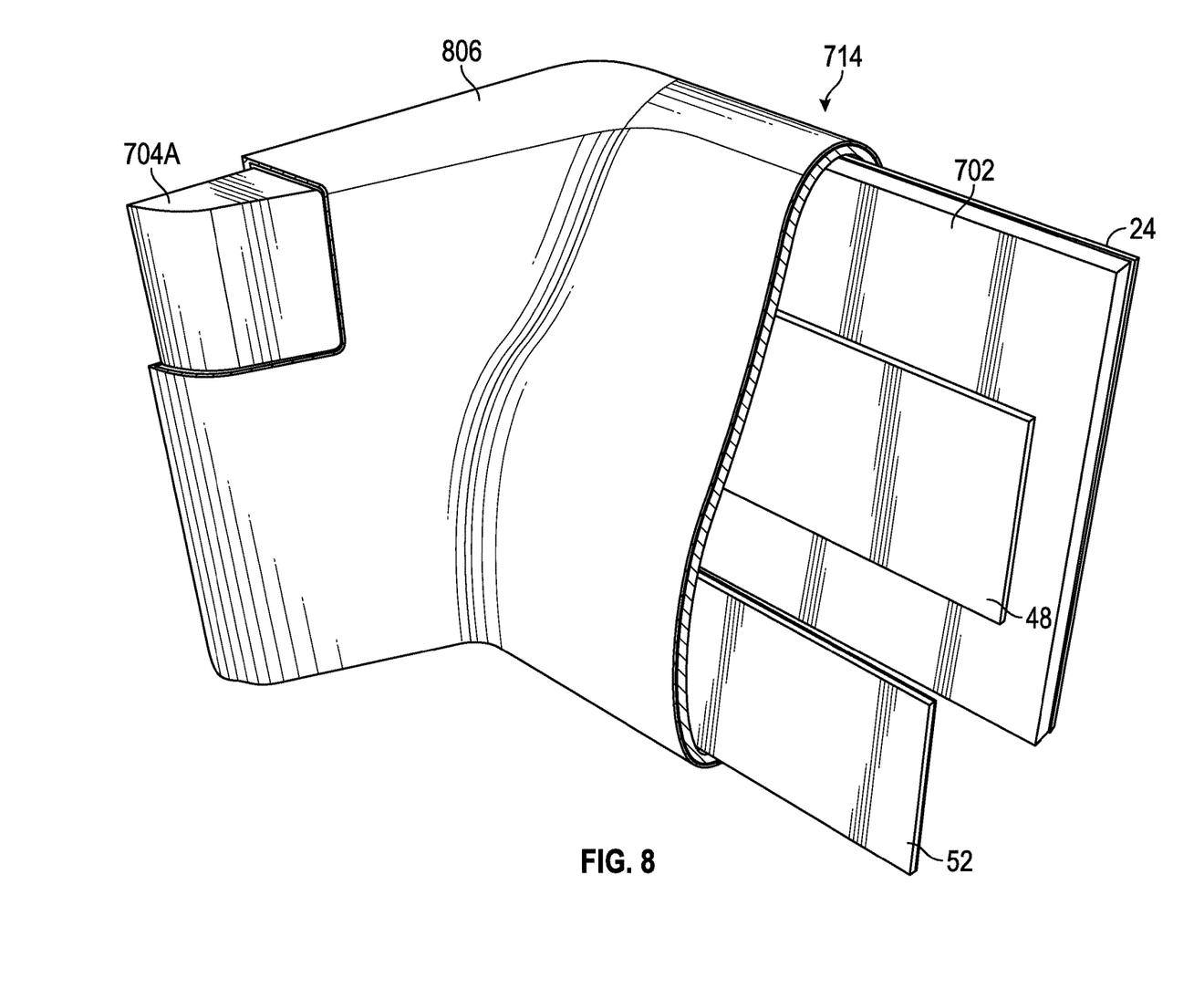
FIG. 8 is a perspective view of the passenger seat headrest of FIG. 7 with a dress cover partially removed.

Referring to FIGS. 7 and 8, another example of a passenger seat headrest 714 is illustrated. As illustrated, the passenger seat headrest 714 is substantially similar to the passenger seat headrest 14 except that the passenger seat headrest 714 does not include the weight-reduction holes 90. FIG. 7 also illustrates attachment holes 792 in the frame 24 and attachment holes 794 in the support 58 configured to receive connectors 796. In the present example, the connectors 796 are screws; however, in various other examples, various other connectors 796 may be utilized including, but not limited to, nuts and bolts, pins, hooks, adhesives, glues, and various other suitable connectors.

In various examples, the passenger seat headrest 714 includes structural foam 702. In some aspects, the structural foam 702 is included to provide additional support to the passenger seat headrest 714. In other aspects, the structural foam 702 is also included to provided padding and cushioning to a passenger, such as to protect the passenger from hitting his or her head against the frame 24 and/or support 58. As one non-limiting example, the structural foam 714 is constructed from polyethylene; however, in various other examples, various other suitable materials may be utilized.

In further examples, the passenger seat headrest 714 includes side wing cushioning 704A,B. The side wing cushioning 704A is provided to cover the first side wing 28 of the frame 24 and the first side wing 62 of the support 58 while the side wing cushioning 704B is provided to cover the second side wing 30 of the frame 24 and the second side wing 66 of the support 58. The side wing cushioning 704A,B is configured to provide padding and cushioning to the passenger's head when using the passenger seat headrest 714. In one non-limiting example, the side wing cushioning 704A,B is constructed from polyurethane; however, in various other examples, various other suitable cushioning material may be utilized.

Referring to FIG. 8, a dress cover 806 can be included with the passenger seat headrest 714 to cover the various components of the passenger seat headrest 714. For example, the dress cover 806 can cover the frame 24, support 58, head support band 48, and neck support band 52. In various examples, the dress cover 806 can be constructed from any material suitable for covering the passenger seat headrest 714 and optionally for providing cushioning to the passenger's head. Thus, it will be appreciated that the material used to construct the dress cover should not be considered limiting on the current disclosure. As one non-limiting example, imitation leather or a combination of upholstery and foam may be used to construct the dress cover 806.

Figure 9:
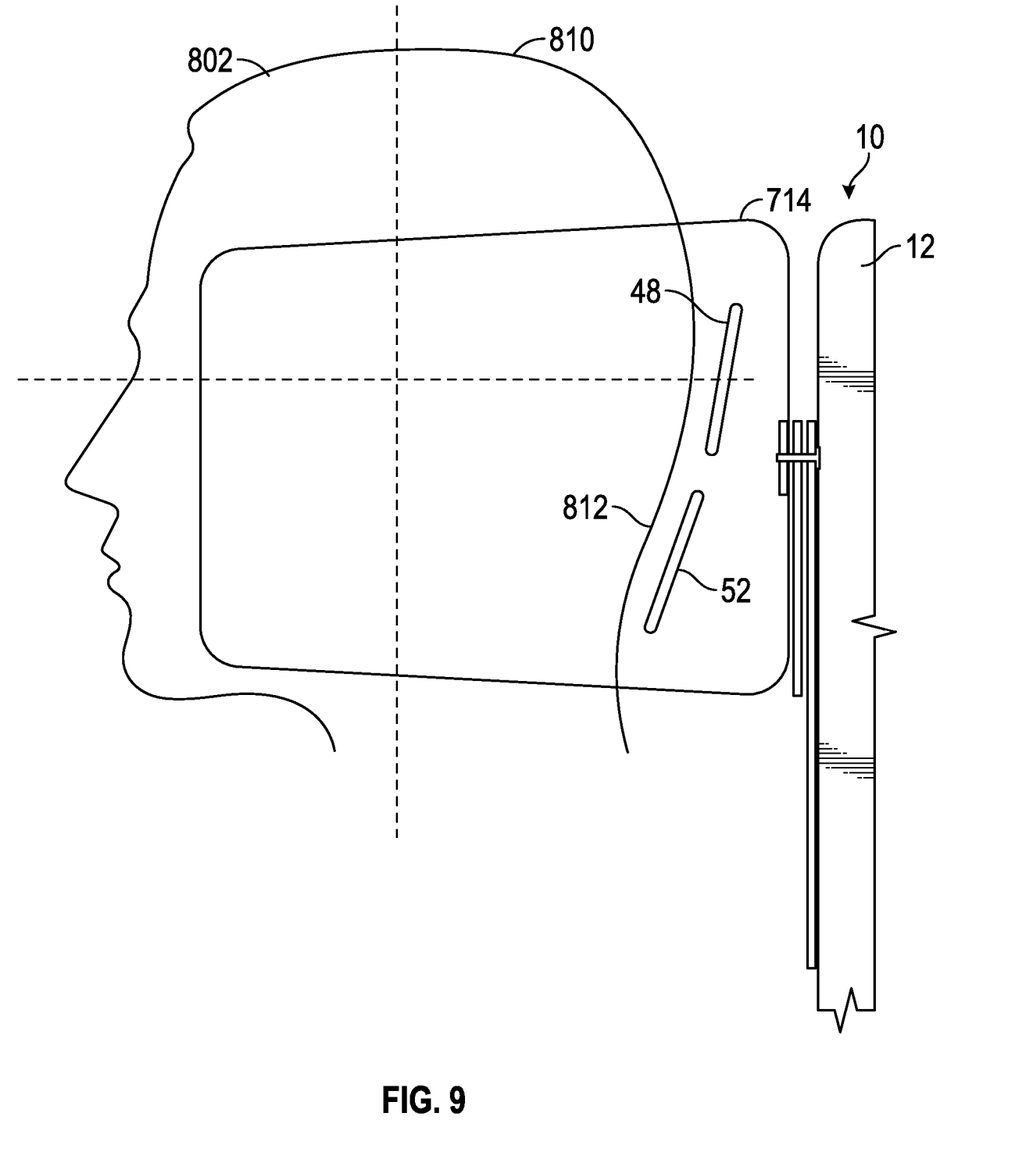
FIG. 9 is side view of a passenger using the passenger seat headrest of FIG. 7.

FIG. 9 illustrates a passenger 808 resting his head 810 on the passenger seat headrest 714. As illustrated in these figures, the neck support band 52 is configured to contact and support the passenger's neck 812 when the passenger 808 leans back against the passenger seat headrest 714, and the head support band 48 is configured to contact and support the passenger's head 810. In some examples, supporting the head 810 and neck 812 of the passenger 808 through the head support band 48 and neck support band 52 can provide an increased comfort experience for the passenger 808.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat headrest comprising: a frame comprising a main portion, a first side wing connected to the main portion, and a second side wing connected to the main portion distal from the first side wing; and a support band connected to the frame and extending from the first side wing to the second side wing.

EC 2. The passenger seat headrest of any of the preceding or subsequent example combinations, wherein the support band is a first support band, and wherein the passenger seat headrest further comprises a second support band connected to the frame and extending from the first side wing to the second side wing.

EC 3. The passenger seat headrest of any of the preceding or subsequent example combinations, wherein the first support band and the second support band are elastic support bands.

EC 4. The passenger seat headrest of any of the preceding or subsequent example combinations, wherein the main portion of the frame comprises a forward surface and an aft surface, wherein the first support band is positioned proximate to the forward surface of the main portion of the frame relative to the second support band, and wherein the first support band is positioned proximate to a top edge of the first side wing and a top edge of the second side wing relative to the second support band.

EC 5. The passenger seat headrest of any of the preceding or subsequent example combinations, wherein the frame comprises: a top edge; a bottom edge distal from the top edge; a first side edge extending from the top edge to the bottom edge; a second side edge extending from the top edge to the bottom edge distal from the first side edge; a forward surface; and an aft surface, wherein the first side edge and the second side edge extend in a forward direction relative to the forward surface of the main portion of the frame.

EC 6. The passenger seat headrest of any of the preceding or subsequent example combinations, further comprising a support connected to the frame, wherein the support comprises a main portion, a first side wing connected to the main portion through a first transition portion, and a second side wing connected to the main portion distal from the first side wing through a second transition portion.

EC 7. The passenger seat headrest of any of the preceding or subsequent example combinations, wherein the main portion of the support is positioned adjacent to the main portion of the frame, wherein the first side wing of the support is positioned adjacent to the first side wing of the frame, wherein the second side wing of the support is positioned adjacent to the second side wing of the frame, and wherein the passenger seat headrest further comprises: a first insert positioned between the first side wing of the frame, the main portion of the frame, and the first transition portion of the support; and a second insert positioned between the second side wing of the frame, the main portion of the frame, and the second transition portion of the support.

EC 8. The passenger seat headrest of any of the preceding or subsequent example combinations, wherein the first side wing and the second side wing of the support each define a securing slot dimensioned to receive at least a portion of the support band.

EC 9. The passenger seat headrest of any of the preceding or subsequent example combinations, wherein the first side wing and the second side wing each define a securing slot, and wherein the elastic strip is secured in the securing slot of the first side wing and the securing slot of the second side wing.

EC 10. The passenger seat headrest of any of the preceding or subsequent example combinations, wherein the frame is constructed from a composite material.

EC 11. A passenger seat comprising: a passenger seat body; and a passenger seat headrest connected to the passenger seat body, the passenger seat headrest comprising: a frame having side wings and defining a head-receiving area; and an elastic support band connected to the frame and spanning across the head-receiving area.

EC 12. The passenger seat of any of the preceding or subsequent example combinations, wherein the passenger seat headrest further comprises: cushioning covering at least a portion of the frame; and a dress cover covering the frame, the elastic support band, and the cushioning.

EC 13. The passenger seat of any of the preceding or subsequent example combinations, wherein the frame is constructed from a composite material.

EC 14. The passenger seat of any of the preceding or subsequent example combinations, wherein the elastic support band is a first elastic support band, and wherein the passenger seat headrest further comprises a second elastic support band connected to the frame and spanning across the head-receiving area.

EC 15. The passenger seat of any of the preceding or subsequent example combinations, wherein the side wings of the frame define a first set of securing slots and a second set of securing slots, wherein the first elastic support band is connected to the frame through the first set of securing slots, and wherein the second elastic band is connected to the frame through the second set of securing slots.

EC 16. A passenger seat headrest comprising: a frame; a support connected to the frame, the support comprising a main portion, a first side wing connected to the main portion and defining a securing slot, and a second side wing connected to the main portion distal from the first side wing and defining a securing slot; and an elastic support band connected to the frame and extending through the securing slot of the first side wing and the securing slot of the second side wing.

EC 17. The passenger seat headrest of any of the preceding or subsequent example combinations, wherein the frame comprises: a main portion; a first side wing connected to the main portion; and a second side wing connected to the main portion distal from the first side wing, wherein the main portion of the frame is adjacent to the main portion of the support, the first side wing of the frame is adjacent to the first side wing of the support, and the second side wing of the frame is adjacent to the second side wing of the support.

EC 18. The passenger seat headrest of any of the preceding or subsequent example combinations, wherein the elastic support band is a first elastic support band, and wherein the passenger seat headrest further comprises a second elastic support band connected to the frame and extending through the first side wing and the second side wing of the support.

EC 19. The passenger seat headrest of any of the preceding or subsequent example combinations, wherein the first side wing of the frame defines a securing slot and the second side wing of the frame defines a securing slot, wherein the securing slot of the first side wing of the frame is aligned with the securing slot of the first side wing of the support, and wherein the securing slot of the second side wing of the frame is aligned with the securing slot of the second side wing of the support.

EC 20. The passenger seat headrest of any of the preceding or subsequent example combinations, further comprising structural foam connected to a forward surface of the support.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A passenger seat headrest comprising:
   a frame comprising a main portion, a first side wing connected to the main portion, and a second side wing connected to the main portion distal from the first side wing;
   a support band connected to the frame and extending from the first side wing to the second side wing; and
   a support connected to the frame, wherein the support comprises a main portion, a first side wing connected to the main portion through a first transition portion, and a second side wing connected to the main portion distal from the first side wing through a second transition portion.

2. The passenger seat headrest of claim 1, wherein the support band is a first support band, and wherein the passenger seat headrest further comprises a second support band connected to the frame and extending from the first side wing to the second side wing.

3. The passenger seat headrest of claim 2, wherein the first support band and the second support band are elastic support bands.

4. The passenger seat headrest of claim 2, wherein the main portion of the frame comprises a forward surface and an aft surface, wherein the first support band is positioned proximate to the forward surface of the main portion of the frame relative to the second support band, and wherein the first support band is positioned proximate to a top edge of the first side wing and a top edge of the second side wing relative to the second support band.

5. The passenger seat headrest of claim 1, wherein the frame comprises:
   a top edge;
   a bottom edge distal from the top edge;
   a first side edge extending from the top edge to the bottom edge;
   a second side edge extending from the top edge to the bottom edge distal from the first side edge;
   a forward surface; and
   an aft surface,
   wherein the first side edge and the second side edge extend in a forward direction relative to the forward surface of the main portion of the frame.

6. The passenger seat headrest of claim 1, wherein the main portion of the support is positioned adjacent to the main portion of the frame, wherein the first side wing of the support is positioned adjacent to the first side wing of the frame, wherein the second side wing of the support is positioned adjacent to the second side wing of the frame, and wherein the passenger seat headrest further comprises:
   a first insert positioned between the first side wing of the frame, the main portion of the frame, and the first transition portion of the support; and a second insert positioned between the second side wing of the frame, the main portion of the frame, and the second transition portion of the support.

7. The passenger seat headrest of claim 1, wherein the first side wing and the second side wing of the support each define a securing slot dimensioned to receive at least a portion of the support band.

8. The passenger seat headrest of claim 1, wherein the first side wing and the second side wing each define a securing slot, and wherein the support band is secured in the securing slot of the first side wing and the securing slot of the second side wing.

9. The passenger seat headrest of claim 1, wherein the frame is constructed from a composite material.

10. A passenger seat comprising:
    a passenger seat body; and
    a passenger seat headrest connected to the passenger seat body, the passenger seat headrest comprising:
      a frame having side wings and defining a head-receiving area;
      an elastic support band connected to the frame and spanning across the head-receiving area; and
      a support connected to the frame, wherein the support comprises a main portion, a first side wing connected to the main portion through a first transition portion, and a second side wing connected to the main portion distal from the first side wing through a second transition portion.

11. The passenger seat of claim 10, wherein the passenger seat headrest further comprises:
    cushioning covering at least a portion of the frame; and
    a dress cover covering the frame, the elastic support band, and the cushioning.

12. The passenger seat of claim 10, wherein the frame is constructed from a composite material.

13. The passenger seat of claim 10, wherein the elastic support band is a first elastic support band, and wherein the passenger seat headrest further comprises a second elastic support band connected to the frame and spanning across the head-receiving area.

14. The passenger seat of claim 13, wherein the side wings of the frame define a first set of securing slots and a second set of securing slots, wherein the first elastic support band is connected to the frame through the first set of securing slots, and wherein the second elastic support band is connected to the frame through the second set of securing slots.

15. A passenger seat headrest comprising:
    a frame comprising a main portion, a first side wing connected to the main portion, and a second side wing connected to the main portion distal from the first side wing;
    a support connected to the frame, the support comprising a main portion, a first side wing connected to the main portion and defining a securing slot, and a second side wing connected to the main portion distal from the first side wing and defining a securing slot; and
    an elastic support band connected to the frame and extending through the securing slot of the first side wing and the securing slot of the second side wing.

16. The passenger seat headrest of claim 15, wherein the main portion of the frame is adjacent to the main portion of the support, the first side wing of the frame is adjacent to the first side wing of the support, and the second side wing of the frame is adjacent to the second side wing of the support.

17. The passenger seat headrest of claim 16, wherein the elastic support band is a first elastic support band, and wherein the passenger seat headrest further comprises a second elastic support band connected to the frame and extending through the first side wing and the second side wing of the support.

18. The passenger seat headrest of claim 16, wherein the first side wing of the frame defines a securing slot and the second side wing of the frame defines a securing slot, wherein the securing slot of the first side wing of the frame is aligned with the securing slot of the first side wing of the support, and wherein the securing slot of the second side wing of the frame is aligned with the securing slot of the second side wing of the support.

19. The passenger seat headrest of claim 15, further comprising structural foam connected to a forward surface of the support.

\* \* \* \* \*